(12) United States Patent
Matsuda et al.

(10) Patent No.: US 7,830,778 B2
(45) Date of Patent: Nov. 9, 2010

(54) OPTICAL INFORMATION RECORDING MEDIUM

(75) Inventors: Isao Matsuda, Gunma (JP); Fumi Hara, Gunma (JP); Takeshi Otsu, Gunma (JP); Motomitsu Hagiwara, Gunma (JP); Akimasa Miyata, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 17 days.

(21) Appl. No.: 12/028,723

(22) Filed: Feb. 8, 2008

(65) Prior Publication Data

US 2008/0198731 A1 Aug. 21, 2008

(30) Foreign Application Priority Data

Feb. 9, 2007 (JP) .............................. 2007-031230

(51) Int. Cl.
*G11B 7/24* (2006.01)

(52) U.S. Cl. .................................. 369/275.1

(58) Field of Classification Search ........................ None
See application file for complete search history.

(56) References Cited

U.S. PATENT DOCUMENTS

| 7,515,552 | B2 | 11/2009 | Abe et al. | |
|---|---|---|---|---|
| 2005/0094546 | A1 | 5/2005 | Katayama et al. | |
| 2006/0035172 | A1* | 2/2006 | Tomura et al. | 430/270.16 |
| 2006/0104194 | A1* | 5/2006 | Ota et al. | 369/275.4 |
| 2006/0105270 | A1* | 5/2006 | Saito | 430/270.16 |
| 2006/0203675 | A1* | 9/2006 | Tomura et al. | 369/59.11 |
| 2007/0133370 | A1* | 6/2007 | Maruyama et al. | 369/94 |
| 2007/0153661 | A1* | 7/2007 | Ando et al. | 369/59.25 |
| 2007/0261068 | A1* | 11/2007 | Yoshihiro et al. | 720/718 |

FOREIGN PATENT DOCUMENTS

| EP | 1530209 A | 5/2005 |
|---|---|---|
| JP | 2005-116126 A | 4/2005 |
| JP | 2005-141809 A | 6/2005 |
| JP | 2005-518055 | 6/2005 |
| JP | 2006-085791 | 3/2006 |
| WO | WO03/069609 A | 8/2003 |

* cited by examiner

*Primary Examiner*—Joseph H Feild
*Assistant Examiner*—Henok Heyi
(74) *Attorney, Agent, or Firm*—Law Office of Katsuhiro Arai

(57) ABSTRACT

An optical information recording medium having a disk-shaped substrate formed with spiral grooves on one main surface, and having an optical reflection layer formed with grooves at the surface corresponding to the grooves of the substrate for reflecting a laser beam, an optical recording layer, a protective layer, and an optical transparency layer in this order on the main surface thereof. The optical information recording medium has a main information area and a sub-information area to the inner circumferential side thereof, in which the track pitch TrB of the grooves in the sub-information area is about 0.32 μm or less, and the depth D of the grooves and the half-band width W of the grooves satisfy a relation represented by: $W \geq 2D+70$, whereby the difference between the reflectivity at the land surface and the reflectivity at the groove surface in the sub-information area can be restricted to less than 30%, thereby preventing occurrence of mis-decipherment for BCA marks.

20 Claims, 3 Drawing Sheets

[Fig. 1]
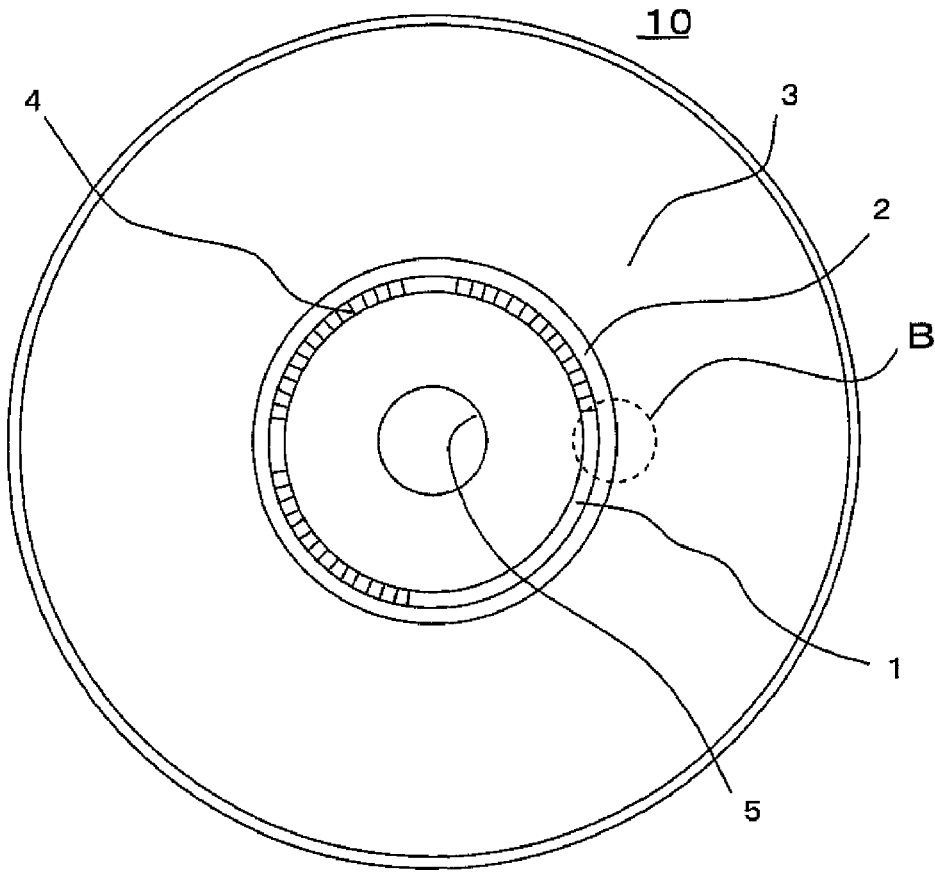
[Fig. 2]
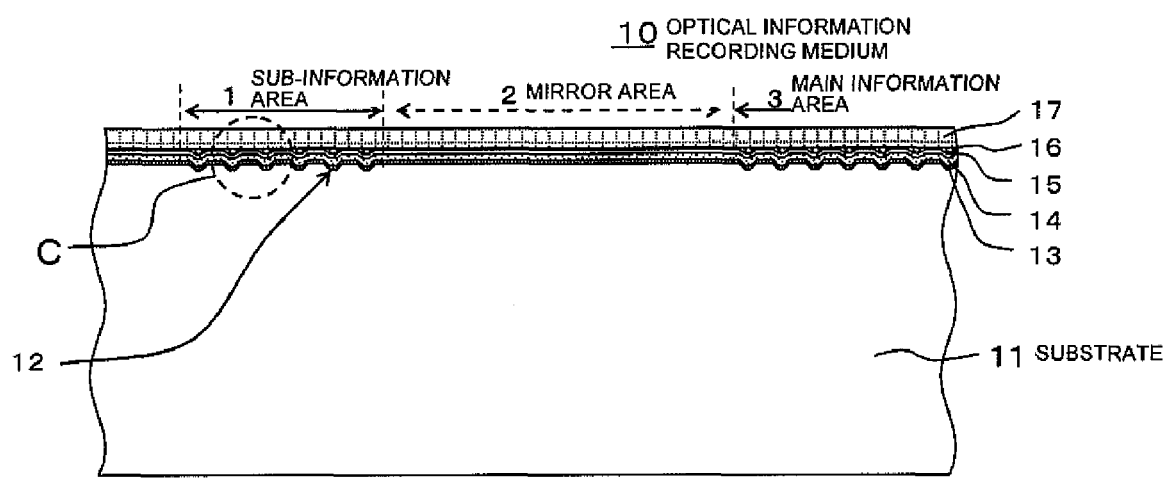

[Fig. 3]
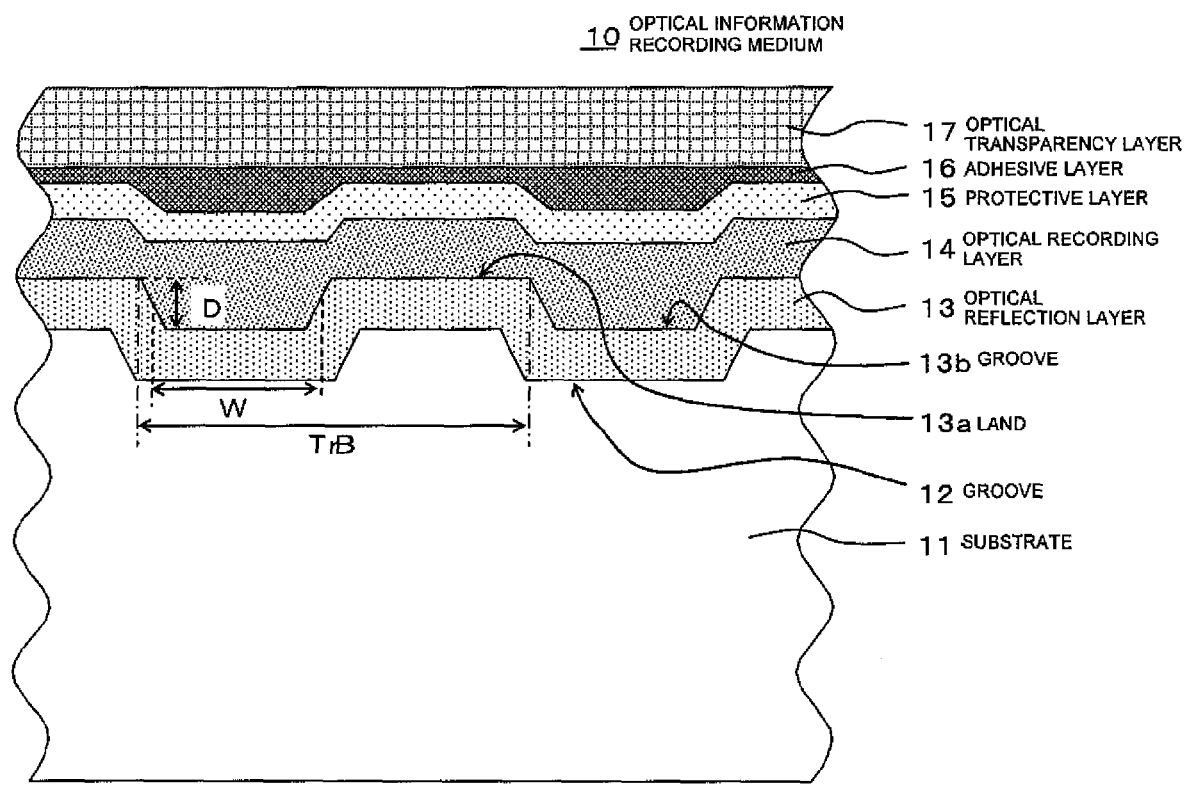

[Fig. 4]
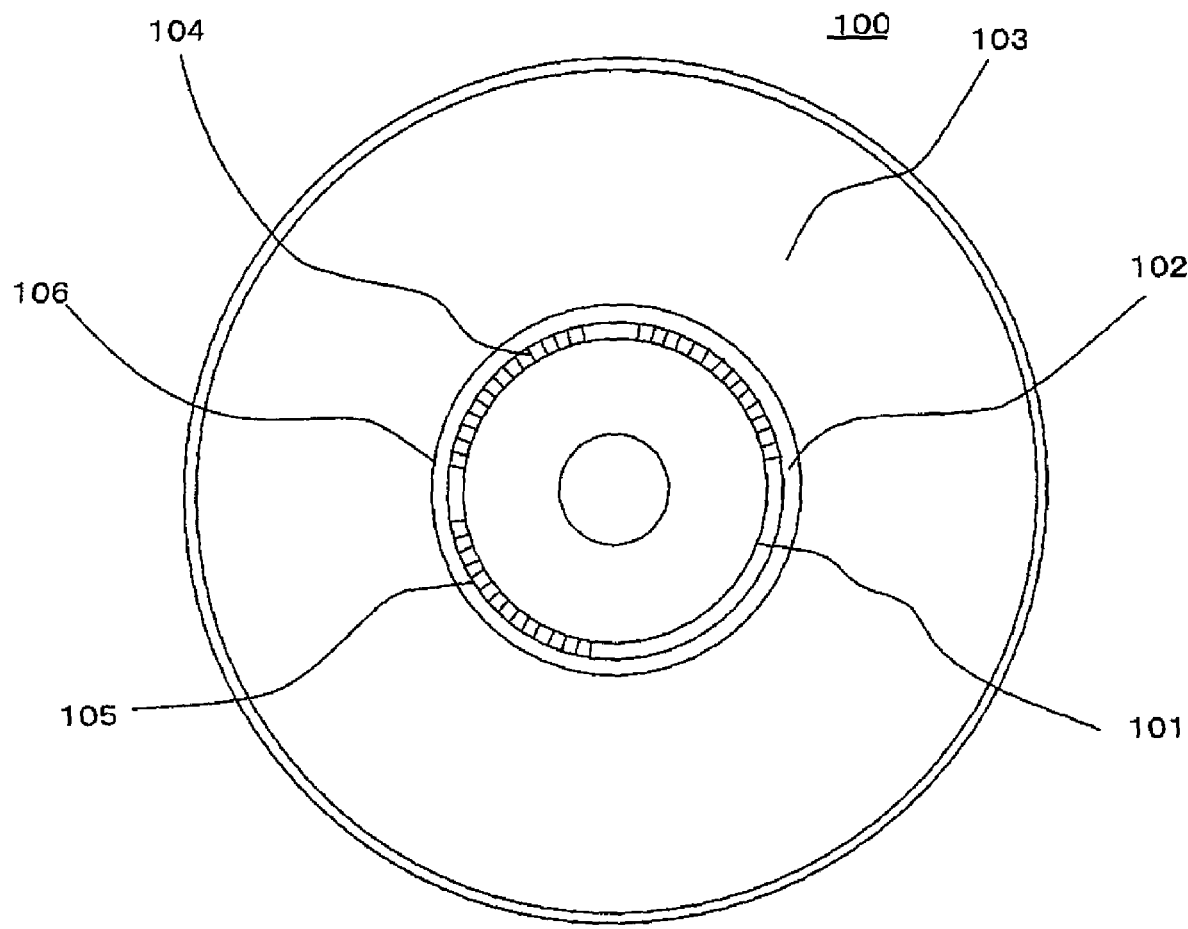
PRIOR ART

OPTICAL INFORMATION RECORDING MEDIUM

BACKGROUND OF THE INVENTION

1. Field of the Invention

The present invention concerns a disk-shaped optical information recording medium and, more specifically, it relates to an optical information recording medium for recording main information, for example, users' information recorded in the form of pits, as well as sub-information, for example, administrative information in the form of bar-codes.

2. Description of the Related Art

In existent disk-shaped optical information recording medium ("optical disk"), administrative information such as serial numbers or lot numbers are bar-coded and recorded thereon. Then, the serial numbers or bar-codes are used for the method of distinguishing whether the medium is an optical information recording medium of authorized manufacturers or dealers.

For example, in an optical information recording medium such as DVD-ROM, a method of recording a bar-code like mark (hereinafter referred to as a "BCA mark") in a BCA (Burst Cutting Area), and reading the BCA mark by an optical head provided to a playback device for reproducing the optical information recording medium, has been proposed and put to practical use.

JP-T-2005-518055 (the term "JP-T-" as used herein means a published Japanese translation of a PCT patent application) describes an optical information recording medium 100. An example of such a medium is shown in FIG. 4. The optical information recording medium 100 has an optical reflection layer, a phase change recording layer and a transparent layer of about 0.1 mm thickness on a disk-shaped substrate of about 120 mm outer diameter, about 15 mm inner diameter and about 1.1 mm thickness. The optical information recording medium 100 is provided with a BCA 101 having BCA marks 104 recorded in a range from about 21 mm to about 22 mm from the center of the substrate, a playback-only area 102 in a range from about 22.4 mm to about 23.2 mm from the center, and a recording and playback area 103 in a range from about 23.2 mm to about 58.6 mm from the center. Then, users' information can be recorded in the recording and playback area 103 by irradiating a laser beam at a wavelength of about 405 nm from an optical head with a number of aperture of about 0.85 from the side of the transparent layer of the optical information recording medium 100. The phase change recording layer is rewritable. For this purpose, it has been proposed to widen the track pitch in the BCA area 101 by about 5 times compared with the track pitch in the recording and playback area 103, thereby preventing tampering of the BCA mark 104 by the information recording drive when accessing the recording and playback area 103. For forming the BCA mark, a red laser at a wavelength of about 650 nm and with a high power of about 900 mW is used. Accordingly, at a portion where the laser beam is irradiated, the phase change recording layer and the optical reflection layer are burnt out by the laser beam to form an opening and the reflectivity at the point has a value approximate to 0%.

For reading the BCA mark, a laser beam at a wavelength of about 405 nm is irradiated by using an optical head with a number of aperture of about 0.85 from the side of the transparent layer of the optical information recording medium 100. The laser beam irradiated to the optical information recording medium 100 and reflected at the optical reflection layer is detected again by the optical head, and put to analog-digital (AD) conversion with a threshold value at 30% reflectivity and the absence or presence of the BCA mark is judged usually. Specifically, in a case where there is a difference of 30% or more between the reflectivity in a non-BCA mark portion and the reflectivity of the BCA mark portion in the BCA area, this is detected as the BCA mark by the playback device.

Further, JP-A-2006-85791 describes that a BCA area is disposed in the same manner as described above to an optical information recording medium having an organic dye recording layer of no reversible change instead of a rewritable phase change recording layer. Specifically, this is an HD DVD-R type optical information recording medium having an optical absorption layer of an organic dye material and an optical reflection layer on a transparent substrate of about 120 mm outer diameter, about 15 mm inner diameter, and about 0.6 mm thickness. Then, in the optical information recording medium, a BCA area is disposed within a range from about 22.2 mm to about 23.2 mm from the center of the substrate, and an administrative information area is disposed within a range from about 23.4 mm to about 23.8 mm from the center of the substrate. Further, a user's information area is disposed within a range from about 23.8 mm to about 58.5 mm from the center of the substrate. Then, user's information can be recorded to the user's information area by irradiating a laser beam at a wavelength of about 400 μm to about 420 μm on the side of a transparent substrate of the optical information recording medium. Further, the medium has grooves in which the track pitch in the BCA area having mirror portions and grooves put between the mirror portions is narrower than the track pitch in the user's information area. Then, by forming a BCA mark in the BCA area, BCA marks can be formed to aimed positions at an accuracy higher than the positional accuracy of the BCA mark recording apparatus.

The optical information recording medium described above with respect to JP-T-2005-518055 has an optical reflection layer, phase change recording layer, and an optical transparency layer of about 0.1 mm thickness on a substrate of about 1.1 mm thickness. Then, in the optical information recording medium, the track pitch in BCA area 101 is widened by about 5 times compared with the track pitch in the recording and playback area 103. In this optical information recording medium, use of a recording layer containing an organic dye instead of the phase change recording layer is to be examined. In the BCA area, increases in light interference lower the reflectivity in an area where grooves are formed. On the other hand, in a land area where the track pitch is widened by about 5 times, a high reflectivity can be obtained. Accordingly, the difference of the reflectivity between the land area and the area where the grooves are formed (hereinafter referred to as "reflectivity difference") is extended to 30% or more. Accordingly, this involves a problem of causing misdecipherment for the bar code information while erroneously taking the lowering of the reflectivity in the area where the grooves are formed for a portion of BCA marks upon reading the BCA marks.

Further, the optical information recording medium described above with respect to JP-A-2006-85791 has an optical absorption layer of an organic dye material and an optical reflection layer on a transparent substrate of about 0.6 mm thickness. Then, the optical information recording medium has grooves with the track pitch in the BCA area narrower than the track pitch in the users' information area. Then, in the optical information recording medium, the depth of the groove (D) is relatively large relative to the width (W) of the groove, measured approximately equidistant from the top and bottom of the groove, in the BCA area (hereinafter referred to as "half-band width"). Accordingly, increases in light interference in the area where the grooves are formed lower the reflectivity in the same manner as described above and the difference between the reflectivity of the land area and the reflectivity of the area where the grooves are formed (hereinafter referred to as "reflectivity difference") is extended to 30% or more. Therefore, this leads to a problem that occurrence of mis-decipherment for the bar code information is inevitable.

SUMMARY OF THE INVENTION

The present invention has been achieved taking notice of the foregoing and an embodiment of the invention intends to provide an optical information recording medium in which an optical recording layer is formed with an organic dye material, wherein the difference between the reflectivity $R_L$ of the land area and the reflectivity $R_G$ in the area where the grooves are formed in the BCA area ("reflectivity difference"), $R_L - R_G$, can be restricted to less than 30%.

One embodiment of the present invention provides an optical information recording medium having a disk-shaped substrate formed with spiral grooves on one main surface, and an optical reflection layer formed with grooves corresponding to the grooves of the substrate at the surface for reflecting a laser beam, an optical recording layer containing an optical absorption material comprising an organic dye that absorbs the laser beam, a protective layer, and an optical transparency layer in this order on the main surface of the substrate.

Then, the optical information recording medium has a main information area for recording optically readable main information by the irradiation of a laser beam to the optical recording layer and a sub-information area on the inner circumferential side to the main information area for recording sub-information of different type from the main information.

Then, in the optical information recording medium, the track pitch TrB of the grooves in the sub-information area is about 0.32 μm or less, and the depth D of the grooves in the sub-information area and the half-band width W of the grooves satisfy a relation presented by: $W \geq 2D+70$.

As described above, the features of an embodiment of an optical information recording medium as the technical means of the invention may be as described below. That is, the track pitch TrB for the grooves in the sub-information area is about 0.32 μm or less, and the depth D for the grooves in the sub-information area and the half-band width W of the grooves satisfy the relation represented by: $W \geq 2D+70$. Accordingly, the difference between the reflectivity $R_L$ at the land face and the reflectivity $R_G$ at the groove surface in the sub-information area ("reflectivity difference"), $R_L - R_G$, can be restricted to less than 30%. This can prevent occurrence of mis-decipherment for the BCA marks.

The above and other objects, as well as features of constitution, and operations and effects of the invention will be apparent from the following description and the accompanying drawings.

BRIEF DESCRIPTION OF THE DRAWINGS

FIG. 1 is a plan view showing the entire structure of a first embodiment of an optical information recording medium according to the invention;

FIG. 2 is an enlarged partial cross sectional view showing the inner structure of an area B surrounded with a broken line in FIG. 1 of the first embodiment of the optical information recording medium according to the invention;

FIG. 3 is an enlarged partial cross sectional view showing details of an area C surrounded with a broken line in FIG. 2 of the first embodiment of the optical information recording medium according to the invention; and FIG. 4 is a plan view showing an optical information recording medium of the related art.

DESCRIPTION OF THE PREFERRED EMBODIMENTS

The present invention is to be described by way of a first embodiment of an optical information recording medium with reference to FIG. 1 to FIG. 3. FIG. 1 is a plan view showing the entire structure of an optical information recording medium 10 of the first embodiment. FIG. 2 is an enlarged partial cross sectional view showing an area B surrounded with a broken line in FIG. 1 for explaining the outline of the inner structure of the embodiment. Further, FIG. 3 is an enlarged partial cross sectional view showing an area C surrounded with a broken line in FIG. 2 for explaining details of the inner structure of the embodiment.

As shown in FIG. 1, an optical information recording medium 10 of this embodiment exhibits a disk-shaped appearance having a central hole 5, and having about 120 mm outer diameter, about 15 mm inner diameter, and about 1.2 mm thickness. The optical information recording medium 10 has, on one main surface, a sub-information area 1 in which grooves to be described later are formed at a track pitch of about 0.32 μm in a range from about 22.0 mm to about 23.0 mm from the center on the side of the inner circumference. BCA marks 4 are optionally formed in the sub-information area 1. Further, a mirror area 2 not having grooves is formed in a range from about 23.0 mm to about 23.2 mm from the center on the side of the outer circumference of the sub-information area 1. Further, a main information area 3 in which grooves are formed at a track pitch of about 0.32 μm in a range from about 23.2 mm to about 58.6 mm from the center is formed on the side of the outer circumference of the mirror area 2.

FIG. 2 shows the outline for the inner structure of an area B surrounded with the broken line in FIG. 1 of the optical information recording medium 10. The optical information recording medium 10 has a disk-shaped substrate 11 of about 1.1 mm thickness in which spiral grooves 12 are formed on one main surface. Then, the substrate 11 has, on the main surface, an optical reflection layer 13 for reflecting a laser beam to be described later, an optical recording layer 14 containing an optical absorption material comprising an organic dye that absorbs a laser beam, a protective layer 15, and an optical transparency layer 17 of about 0.1 mm thickness in this order as described later.

When a laser beam at a wavelength of about 400 to about 420 nm (for example, 405 nm) is irradiated based on the recording information to the main information area 3 of the optical information recording medium 10, an optically readable main formation is recorded to the optical recording layer 14. Further, the optical information recording medium 10 has a sub-information area 1 on the inner circumference side of the main information area 3 for recording sub-information different in type, for example BCA marks 4, from the main information. Then, FIG. 3 shows details for the inner structure of the sub-information area 1 for the area C surrounded with a broken line in FIG. 2. On one main surface of the substrate 11, grooves 12 are formed at a track pitch TrB. The optical information recording medium 10 has an optical reflection layer 13, an optical recording layer 14, and a protective layer 15 in this order on the surface of the substrate 11 where the grooves 12 are formed. Then, in the optical information recording medium 10, a sheet-shaped optical transparency layer 17 of about 0.1 mm thickness is bonded on the protective layer 15 by an adhesive layer 16.

At the surface of the optical reflection layer 13 on the side opposite to the side in contact with the main surface of the substrate 11 formed with the grooves 12, are formed grooves 13b formed spirally at a track pitch TrB equal with that of the grooves 12 in the substrate 11 so as to correspond to the grooves 12 of the substrate 11 and lands 13a adjacent with the grooves 13b.

The track pitch TrB for the grooves 13b in the sub-information area 1 is, for example, about 0.32 μm. Further, the depth D for the groove 13b in the sub-information area 1 is, for example, about 35 nm, and the half-band width W for the groove 13b is, for example, about 140 nm. Then, the value: 2D+70 is 140 which is equal with the half-band width W and satisfies a relation represented by: $W \geq 2D+70$.

Further, the grooves formed in the main information area 3, although not illustrated in the drawing, have a track pitch of about 0.32 μm, a depth of the groove of about 35 nm, and a half-band width of the groove of about 140 nm like the grooves 13b formed in the sub-information area 1.

A preferred embodiment of the substrate 11 is as described below. That is, for the substrate 11, various materials used as substrate materials for existent optical information recording media can be selected and used optionally. Specifically, they include, for example, polycarbonate, acrylic resins such as polymethyl methacrylate, vinyl chloride resins such as polyvinyl chloride and vinyl chloride copolymers, epoxy resins, amorphous polyolefins, polyester resins, metals such as aluminum, and glass. Several species can be optionally selected from the materials and used in combination. Among the materials, thermoplastic resins are preferred with a view point of moldability, moisture-proofness, size stability, and low cost, and polycarbonates are particularly preferred.

In a case of using the resins described above, the substrate 11 is preferably prepared by a method such as injection molding into a predetermined shape (disk-shaped in a case of an optical disk). The thickness of the substrate 11 is preferably within a range from about 0.9 mm to about 1.1 mm. This is not restrictive but a UV-ray curable resin may be used, for example, and coated on a substrate and then the coating film may be cured and used.

A preferred embodiment of the spiral groove 12 is as described below. That is, the grooves 12 are preferably formed in the sub-information area on the inner circumferential side and in the main information area on the outer circumferential side on one main surface of the substrate 11. The grooves in the main information area 3 are preferably formed spirally at a track pitch, for example, of about 0.32 μm. Further, the grooves 12 in the sub-information area 1 are preferably formed spirally at a track pitch TrB of about 0.32 μm or less.

Further, the depth for the groove 12 in the sub-information area 1 is preferably approximately equal with the depth of the grooves in the main information area 3. Further, it is more preferred that the half-band width for the groove 12 in the sub-information area 1 is approximately equal with the half-band width for the groove in the main information area.

It is preferred that a mold plate referred to as a stamper applied with fine fabrication of spiral ridges in a pattern opposite to that of the grooves 12 on one main surface is disposed in a metal mold used for injection molding of the substrate 11 and the grooves 12 are formed simultaneously with the injection molding of the substrate 11.

Then, a preferred embodiment of the optical reflection layer 13 is as described below. The optical reflection layer 13 is used for reflecting a laser beam for data recording and/or playback. In the invention, the optical reflection layer 13 is preferably disposed between the substrate 11 and the optical recording layer 14 for providing function of increasing the reflectivity to the laser beam and improving the recording and playback characteristics. For the optical reflection layer 13, metal films such as of Au, Al, Ag, Cu, Pd, alloy films of such metals, or alloy films with the addition of micro ingredients to the metals described above are preferred. Then, the optical reflection layer 13 is preferably formed on the surface of the substrate 11 formed with the grooves 12, for example, by a vapor deposition method, an ion plating method, or a sputtering method. Among them, the sputtering method is particularly preferred with the view point of mass productivity and the cost. In the optical reflection layer 13, spiral grooves 13b are formed preferably at a track pitch equal with the grooves 12 of the substrate 11 at the surface on the side opposite to the side in contact with the main surface of the substrate so as to correspond to the grooves 12 of the substrate 11. Further, the grooves 13b are formed preferably by forming the optical reflection layer 13 to a uniform thickness by the sputtering method or the like on the main surface of the substrate 11 formed with the spiral grooves.

A preferred embodiment of the grooves 13b is as described below. That is, the grooves 13b are preferably formed on the surface of the optical reflection layer 13 disposed on one main surface of the substrate 11 corresponding to the grooves 12 of the substrate 11. Then, the grooves 13b are preferably formed spirally in the sub-information area 1 on the inner circumferential side and in the main information area 3 on the outer circumferential side respectively as a guide for tracking during recording and/or playback by laser beam irradiation. Further, the grooves in the main information area 3 preferably have a track pitch, for example, of about 0.32 μm. Further, the grooves 13b in the sub-information area 1 preferably have a track pitch TrB of about 0.32 μm or less. Further, it is preferred that the half-band width W for the grooves 13b and the depth D for the grooves 13b satisfy the relation: $W \geq 2D+70$.

Further, the depth D for the groove 13b is more preferably approximately equal with the depth for the groove in the main information area. Further, the half-band width W for the groove 13b is more preferably approximately equal with the half-band width for the groove in the main information area.

A preferred embodiment of the optical recording layer 14 is as described below. That is, the optical recording layer 14 preferably contains an optical absorption material comprising an organic dye that absorbs a laser beam. Among all, a dye type optical recording layer in which pits are formed by the irradiation of the laser beam to record the data is preferred. As the organic dye, phthalocyanine dyes, cyanine dyes, and azo dyes are preferred. For the procedure of forming the optical recording layer 14, for example, an azo dye represented by the chemical formula 1 is dissolved together with a binder into a solvent, for example TFP (tetrafluoro propanol), to prepare a coating solution. Then, the coating solution is coated by a spin coat method or screen printing on the substrate 11 directly or by way of other layer, for example the optical reflection layer to form a coating film. Then, the optical recording layer 14 is formed preferably by drying, for example, at a temperature of 80° C. for about 30 min.

[Chemical formula 1]

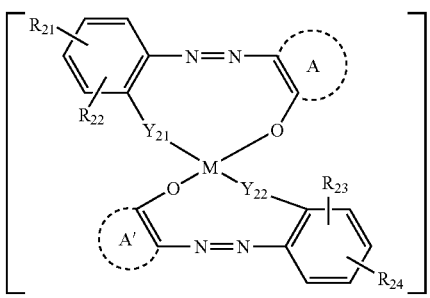

(where A and A' each represents a heterocyclic ring identical or different with each other, each containing one or a plurality of hetero atoms selected from nitrogen, oxygen, sulfur, selenium, and tellurium; $R_{21}$ to $R_{24}$ each represents independently a hydrogen atom or a substituent; and $Y_{21}$ and $Y_{22}$ each represents a hetero atom identical or different from each other selected from the elements in group 16 of the periodical table).

Then, a preferred embodiment of the protective layer 15 is as described below. The protective layer 15 is formed preferably between the optical recording layer 14 and the optical transparency layer 17 to be described later with an aim of controlling the recording property, or improving the bondability or protection, for the optical recording layer 14.

For the protective layer 15, a transparent film comprising, for example, $SiO_2$, $ZnS$—$SiO_2$, or $Nb_2O_5$—$Al_2O_5$ is preferred and the layer is formed preferably on the surface formed with the optical recording layer 14, for example, by a vapor deposition method, an ion plating method, or a sputtering method. Among all, the sputtering method is particularly preferred with a view point of the mass productivity and the cost.

Then, a preferred embodiment of the adhesive layer 16 is as described below. For the adhesive layer 16, those comprising epoxy or other like transparent reactiveness stiffening resins, or UV-ray curable transparent resins as the main ingredient are preferred. Then, the adhesive layer 16 is coated by means such as a spin coat method or screen printing on the protective layer 15 and/or to the lower surface of the sheet-shaped optical transparency layer 17 of about 0.1 mm thickness to be described later. Then, the protective layer 15 of the substrate 11 and the sheet-shaped optical transparency layer 17 are bonded by the adhesive layer 16 to obtain a disk-shaped optical information recording medium of about 1.2 mm thickness.

A preferred embodiment of the optical transparency layer 17 is as described below. That is, as the optical transparency layer 17, those comprising transparent resins are preferred. More specifically, it is preferred to use a sheet of about 0.1 mm thickness comprising resins of favorable optical transparency such as polycarbonate resins and acrylic resins.

Usually, the thickness of the optical transparency layer 17 is preferably about 0.1 mm to be constituted such that a laser beam at a wavelength of about 400 nm to about 420 nm is usually irradiated to record the data in the optical recording layer 14 and/or read the data from the optical recording layer 14.

An example of the optical information recording medium 10 of an embodiment of the invention is to be described.

EXAMPLE

At first, photoresists (photosensitizers) were coated by a spin coat method to predetermined thicknesses respectively on glass board to form resist films. Then, after exposing the resist film to a laser beam of a cutting device from above, so as to provide a predetermined size for the exposure width, a developer was dropped on each of the obtained glass boards and put to development. Thus, concave/convex resist patterns corresponding to the grooves of the substrates of the disk-shaped optical information recording media were formed.

Then, after depositing nickel on the glass board by plating, nickel was separated from the glass board and each outer profile was trimmed into a disk shape to obtain stampers.

Then, the stampers were set in the cavity of an injection molding device and a polycarbonate resin was injected into the cavity to obtain substrates of Specimen Nos. 1 to 20 each having spiral grooves on one main surface.

An Ag alloy was sputtered to a uniform thickness on the main surface of the substrate formed with the spiral grooves by using a sputtering device. Thus, an optical reflection layer 13 of about 100 nm thickness having spiral grooves corresponding to the grooves of the substrate at the surface on the side opposite to the side in contact with the main surface of the substrate formed with the grooves was disposed.

Further, an organic solution containing the azo type organic dye represented by the chemical formula 1 was coated by a spin coat method to about 60 nm thickness on the substrates.

Then, $ZnS$—$SiO_2$ was sputtered above the substrates by using the sputtering device to form protective films each of about 25 nm thickness.

Then, a UV-ray curable adhesive comprising an acrylic resin as the main ingredient was coated on the substrates. Then, a disk-shaped sheet made of polycarbonate resin of about 0.1 mm thickness was bonded on each substrate and UV-rays were irradiated to cure the adhesive, to obtain disk-shaped optical information recording media of about 1.2 mm thickness.

Then, BCA marks 4 each having a circumferential width of 10 μm were formed in the sub-information area of the optical information recording media to obtain specimens of disk-shaped optical information recording media. In a BCA cutting device having a laser wavelength at 810 nm and a beam diameter of about 0.85 μm×about 35 μm, the conditions for forming the BCA marks 4 were set to a laser power of 5.5 W, a cutting speed of 1000 rpm, a radial beam feed amount of 10 μm, a recording start position of 21.0 mm, and a recording end position of 22.0 mm.

Then, the reflectivity $R_L$ at the land surface and the reflectivity $R_G$ at the groove surface in the sub-information area of the specimens of optical information recording media were observed by using a commercial recording and playback device ODU-1000 manufactured by Pulsetec Co. at a laser wavelength of 405 nm, with a number of aperture of 0.85 and at a line speed of 4.92 m/s.

Further, the shape of the grooves of the obtained specimens of optical information recording media was measured in the radial direction of the optical information recording medium by AFM. As a result, it was confirmed that they were specimens of disk-shaped optical information recording media having the following grooves.

The track pitch in the main information area was 0.32 μm and the track pitch TrB in the sub-information area was one of 1.0 μm, 0.32 μm, and 0.25 μm. Further, the half-band width W for the grooves in the main information area and the sub-information area was one of 120 nm, 140 nm, 160 nm, and 180 nm, and the depth D for the groove was one of 25 nm, 35 nm, 45 nm, and 55 nm.

For the disk-shaped optical information recording media of Specimens Nos. 1 to 20 obtained as described above, Table 1 shows the result of measurement for the track pitch TrB, groove depth D, the groove half-band width W, and difference $R_L-R_G$ between the reflectivity $R_L$ at the land surface and the reflectivity $R_G$ at the groove surface.

TABLE 1

| Specimen No. | Track pitch: TrB [μm] | Groove depth: D [nm] | Groove half-band width: W [nm] | Reflectivity difference: $R_L-R_G$ [%] |
| --- | --- | --- | --- | --- |
| *1  | 1.00 | 35 | 120 | 64.3 |
| *2  | 1.00 | 45 | 160 | 67.8 |
| 3   | 0.32 | 25 | 120 | 18.1 |
| 4   | 0.32 | 35 | 120 | 29.6 |
| *5  | 0.32 | 45 | 120 | 42.8 |
| *6  | 0.32 | 55 | 120 | 53.5 |
| 7   | 0.32 | 25 | 140 | 17.2 |
| 8   | 0.32 | 35 | 140 | 25.9 |
| *9  | 0.32 | 45 | 140 | 36.9 |
| *10 | 0.32 | 55 | 140 | 49.0 |
| 11  | 0.32 | 25 | 160 | 14.8 |
| 12  | 0.32 | 35 | 160 | 20.3 |
| 13  | 0.32 | 45 | 160 | 27.1 |
| *14 | 0.32 | 55 | 160 | 40.4 |
| 15  | 0.32 | 25 | 180 | 7.0 |
| 16  | 0.32 | 35 | 180 | 11.5 |
| 17  | 0.32 | 45 | 180 | 6.5 |
| 18  | 0.32 | 55 | 180 | 24.1 |
| 19  | 0.25 | 35 | 120 | 15.5 |
| 20  | 0.25 | 45 | 160 | 12.3 |

Symbols * indicate comparative examples

As shown in Table 1, in Specimen Nos. 1 and 2 having the track pitch TrB in the sub-information area 1 of 1.0 μm, which was more than 0.32 μm, the reflectivity difference $R_L-R_G$ was 64.3% and 67.8%, which exceeded 30%. Further, among specimens having the track pitch TrB of 0.32 μm, in the Specimen Nos. 3, 4, 7, 8, 11, 12, 13, 15, 16, 17, and 18 in which the half-band width W of the grooves satisfied the relation W≧2D+70, the reflectivity difference $R_L-R_G$ was 18.1%, 29.6%, 17.2%, 25.9%, 14.8%, 20.3%, 27.1%, 7.0%, 11.5%, 6.5%, and 24.1% respectively, each of which was less than 30%. On the other hand, in the Specimens Nos. 5, 6, 9, 10, and 14 in which the half-band width W for the grooves did not satisfy the relation: W≧2D+70, the reflectivity difference $R_L-R_G$ was 42.8%, 53.5%, 36.9%, 49.0%, and 40.4% respectively, each of which was more than 30%.

Further, in the Specimens Nos. 19 and 20 having the track pitch TrB of 0.25 μm which was less than 0.32 μm, the reflectivity difference $R_L-R_G$ was 15.5% and 12.3%, each of which was less than 30%.

In the optical information recording medium of the first embodiment, the main information area 3 and the sub-information area 1 on the inner circumferential side of the main information area 3 are provided with the mirror area 2 being put therebetween, but the invention is not restricted thereto and, for example, a preformat area may further be provided in the mirror area 2.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. An optical information recording medium having a single optical recording layer and a single optical reflection layer, comprising:
    a disk-shaped substrate in which spiral grooves are formed on one main surface;
    the optical reflection layer formed at the main surface of the substrate with grooves corresponding to the grooves of the substrate for reflecting a laser beam;
    the optical recording layer, formed on the optical reflection layer, containing an optical absorption material comprising an organic dye that absorbs the laser beam, said optical reflection layer and said optical recording layer being formed on the substrate in this order for providing a function of increasing the reflectivity of the laser beam and improving the recording and playback characteristics of the optical recording layer;
    a protective layer formed on the optical recording layer; and
    an optical transparency layer formed on the protective layer,
    wherein the optical recording layer comprises a main information area for recording optically readable main information by the irradiation of a laser beam and a Burst Cutting Area (BCA) as a sub-information area on the inner circumferential side of the main information area for recording sub-information different with respect to a type from the main information; and
    wherein a track pitch TrB of grooves formed in the sub-information area is different from that of grooves formed in the main information area and is about 0.32 μm or less, and the depth D and the half-band width W of the grooves of the optical reflection layer in the sub-information area satisfy a relation represented by: W≧2D+ 70, said relation being such that a difference between a reflectivity $R_L$ of the land area and a reflectivity $R_G$ in the groove area in the sub-information area, $(R_L-R_G)/R_L$ is less than 30%.

2. The optical information recording medium of claim 1, wherein the track pitch TrB is about 0.32 μm.

3. The optical information recording medium of claim 1, wherein the track pitch TrB is about 0.25 μm.

4. The optical information recording medium of claim 3, wherein a difference between a reflectivity of a land area between the grooves in the sub-information area, and a reflectivity of an area containing grooves in the sub-information area is less than about 20%.

5. The optical information recording medium of claim 1, wherein a difference between a reflectivity of a land area between the grooves in the sub-information area, and a reflectivity of an area containing grooves in the sub-information area is less than about 30%.

6. The optical information recording medium of claim 1, wherein D is at least about 25 nm and at most about 55 nm.

7. The optical information recording medium of claim 1, wherein W is at least about 120 nm and at most about 180 nm.

8. The optical information recording medium of claim 1, wherein the track pitch of the grooves formed in the sub-information area is approximately equivalent to a track pitch of grooves formed in the main information area.

9. The optical information recording medium of claim 1, wherein the organic dye is an azo dye.

10. A method of fabricating an optical information recording medium having a single optical recording layer and a single optically reflective film, comprising:
sputtering an alloy of Au, Al, Ag, Cu, or Pd onto a disk-shaped substrate having grooves formed thereon between about 21 mm and about 22 mm from the center, thereby forming the optically reflective film with corresponding grooves;
coating the optically reflective film with an optical absorption material comprising an organic dye that absorbs an irradiated laser, thereby forming the optical recording layer with grooves, wherein the optical recording layer comprises a main information area for recording optically readable main information by the irradiation of a laser beam and a Burst Cutting Area (BCA) as a sub-information area on the inner circumferential side of the main information area for recording sub-information different with respect to a type from the main information, wherein a track pitch TrB of the optical recording layer grooves is different from that of grooves formed in the main information area and is about 0.32 μm or less, and the depth D and the half-band width W of the grooves of the optically reflective film satisfy a relation represented by: W≧2D+70, said relation being such that a difference between a reflectivity $R_L$ of the land area and a reflectivity $R_G$ in the groove area in the sub-information area, $(R_L-R_G)/R_L$, is less than 30%, said optically reflective film and said optical recording layer being formed on the substrate in this order for providing function of increasing the reflectivity of the laser beam and improving the recording and playback characteristics of the optical recording layer;
sputtering $SiO_2$, $ZnS-SiO_2$, or $Nb_2O_5-Al_2O_5$ onto the optical recording layer, thereby forming a protective layer; and
adhering a transparent resin to the protective layer.

11. The method of claim 10, further comprising forming the substrate having the grooves thereon by injection molding.

12. The method of claim 10, further comprising forming marks in the optical recording layer grooves representative of a serial number or bar code.

13. The method of claim 12, wherein the marks are BCA marks.

14. The method of claim 10, wherein the track pitch TrB is about 0.32 μm.

15. The method of claim 10, wherein the track pitch TrB is about 0.25 μm.

16. The method of claim 10, wherein D is at least about 25 nm and at most about 55 nm.

17. The method of claim 10, wherein W is at least about 120 nm and at most about 180 nm.

18. The method of claim 10, wherein the organic dye is an azo dye.

19. The optical information recording medium of claim 9, wherein the azo dye is a dye represented by the chemical formula as below:

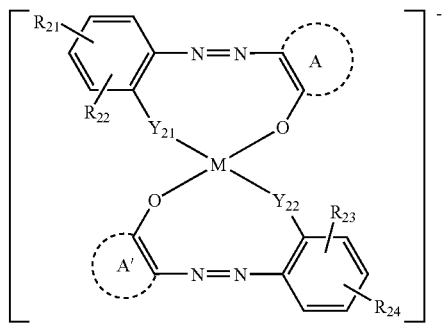

where A and A' each represents a heterocyclic ring identical or different with each other, each containing one or a plurality of hetero atoms selected from nitrogen, oxygen, sulfur, selenium, and tellurium; $R_{21}$ to $R_{24}$ each represents independently a hydrogen atom or a substituent; and $Y_{21}$ and $Y_{22}$ each represents a hetero atom identical or different from each other selected from the elements in group 16 of the periodical table.

20. The method of claim 18, wherein the azo dye is a dye represented by the chemical formula as below:

[Chemical formula 1]

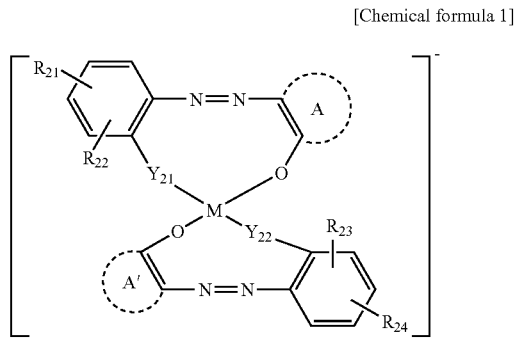

where A and A' each represents a heterocyclic ring identical or different with each other, each containing one or a plurality of hetero atoms selected from nitrogen, oxygen, sulfur, selenium, and tellurium; $R_{21}$ to $R_{24}$ each represents independently a hydrogen atom or a substituent; and $Y_{21}$ and $Y_{22}$ each represents a hetero atom identical or different from each other selected from the elements in group 16 of the periodical table.

* * * * *